United States Patent [19]

Swofford

[11] 4,014,586

[45] Mar. 29, 1977

[54] COMBINED TRAILER-CAMPER UNIT

[75] Inventor: Aubrey L. Swofford, Greenwood, S.C.

[73] Assignee: Engineering Concepts, Inc., Greenwood, S.C.

[22] Filed: June 26, 1975

[21] Appl. No.: 590,640

[52] U.S. Cl. ............................. 296/23 A; 296/23 G
[51] Int. Cl.² .......................................... B60P 3/34
[58] Field of Search ............ 296/23 A, 23 F, 23 G, 296/23 R, 27; 224/42.1 E

[56] References Cited

UNITED STATES PATENTS

| 1,579,815 | 4/1926 | Humphrey | 296/23 A |
| 3,065,019 | 11/1962 | May | 296/23 F |

FOREIGN PATENTS OR APPLICATIONS

| 14,786 | 12/1966 | Austria | 296/23 A |
| 168,940 | 1/1951 | Austria | 296/23 A |
| 191,287 | 2/1950 | United Kingdom | 296/23 A |

*Primary Examiner*—Robert R. Song
*Attorney, Agent, or Firm*—Wellington M. Manning, Jr.

[57] ABSTRACT

A combined trailer-camper unit is disclosed and claimed herein suitable for towing behind a motorcycle, a small automobile or the like. A wheeled frame is provided having a body secured thereto. The body comprises a bottom section and a top section associated therewith and has a luggage rack provided atop same. The luggage rack is pivotally secured at a forward end of the body and in a luggage carrying capacity resides atop the body. The luggage rack can be pivotally moved to an extended position in front of the body top and is supported by a portion of the wheeled frame. In this position, the underside of the rack provides an extension that is co-planar with the top of the body to define a floor for sleeping or the like. A tent or other suitable structure that may be conveniently carried within the body of the unit can then be erected atop the body and luggage rack extension and secured thereto along the sides. Both ends of the trailer are provided with leveling means to stabilize the unit when it is disconnected from a towing unit. Moreover, the body top may contain a closeable opening therein to permit ingress to the body compartment when the tent structure is erected. Other accessories such as air mattresses, ice chests and the like may also be incorporated into or associated with the present unit.

13 Claims, 5 Drawing Figures

COMBINED TRAILER-CAMPER UNIT

BACKGROUND OF THE INVENTION

In recent years camping has changed from some means to enable hunters, fisherman and the like to suffer in the wilds over a extended period of time to a situation where millions of persons in family units as well as the outdoorsmen are seeking recreational enjoyment in the out of doors. Also, campgrounds erected in resort and recreational areas now permit one to live in his own tent, camper, or the like in lieu of staying in a motel, hotel or the like. In this vein, a wide variety of types and styles of vehicles referred to as "campers" have been developed. Certain of these vehicles are self-propelled and afford a self-contained unit for transportation and living accommodations away from home. Other of these units have been designed for towing by a vehicle.

Normally, a towed camper is of one of two types. Certain of the towed campers are full size and are substantially self-contained as to the living accommodations. A large number of the different campers, however, are collapsible in some sense to provide a compact unit to be towed behind a vehicle. Upon reaching a nightly destination the camper is erected to provide a structure above the compact trailer. Various side wall constructions and enlarged surface areas or the like may be provided. In many of these collapsible, or fold-out campers, stoves and the like utilities are now built-in to afford additional convenience at the camp site.

The trailer-camper unit of the present invention represents yet another device in the general area of camping with certain unique features pertinent thereto. For instance, a majority of the campers heretofore produced have been designed for connection behind large size vehicles, for towing. The present invention, however, provides a trailer-camper unit that may be suitably towed behind a compact automobile, a motorcycle or the like. Additionally, the trailer-camper unit of the present invention is convertible to use as a utility trailer only; for use as a covered trailer that may be towed behind a vehicle to permit transportation of additional luggage, equipment or the like; and may be used as a combination luggage carrier and camping facility which may be erected on site to afford sleeping accommodations for two adults.

In possessing the above referred to attributes, the trailer-camper unit of the present invention is unique in construction and utility as will be alluded to hereinafter. The prior art is devoid of any teaching or suggestion of the trailer-camper unit of the present invention. Exemplary of the prior art are U.S. Pat. Nos. 1,276,388 to Marx; 3,149,876 to Melbye; 3,549,196 to Laney; 3,614,142 to Hancock; 3,703,311 to Davis et al; 3,709,551 to McCarthy; 3,715,141 to Cary; 3,724,893 to Giroux; 3,788,670 to Petersen and 3,823,975 to Cooper.

SUMMARY OF THE INVENTION

It is an object of the present invention to provide an improved trailer-camper combination unit that may be towed by a motorcycle or a small automobile.

Another object of the present invention is to provide an improved trailer-camper unit that is compact.

Yet another object of the present invention is to provide a trailer for a motorcycle, or small automobile that may be quickly and easily converted into a camper unit.

Generally speaking, the present invention relates to a trailer-camper combination comprising a wheeled frame; a tongue secured to said frame and extending outwardly therefrom; a body secured to said frame, said body having a pair of mating sections cooperating to define an enclosure, said sections being connected to each other along an edge thereof; a luggage rack associated with said enclosure, said luggage rack being associable with said tongue and said enclosure in one position to provide a planar surface extension of a top of said closure; and collapsible cover means secureable to said enclosure and said luggage rack to provide a habitable compartment atop said enclosure and said luggage rack.

More specifically, the present invention utilizes a chassis normally supported by two wheels and having an elongated tongue element extending outwardly for connection to the towing vehicle. A trailer body is provided that includes two mateable sections that cooperate to define a body enclosure therebetween. The bottom section is secured to the chassis while the top body section is secureable to the bottom section along the edges thereof.

In a preferred arrangement, the top body section is hingedly secured to the bottom section along one edge with appropriate latches being provided around the remainder of the perimeter as desired so as to permit ready access to the enclosure. Also hingedly connected to the top section along a forward end thereof, is a luggage rack having upstanding side walls therearound so as to permit the receipt of additional luggage without the enclosure. The luggage rack has an elongated member that extends upwardly therefrom such that when the luggage rack is pivoted forwardly around its hinge connection, the side walls are present on the underneath while the bottom of the luggage rack defines an extension of the planar surface of the top body section. The elongated element of the luggage rack engages the tongue for support. In this preferred configuration, a 4 foot by 7 foot planar surface is constructed for a sleeping support.

Once the trailer-camper of the present unit is in the extended position, a tent or other structure that is conveniently stored within the enclosure may be erected atop the planar surface floor support and secured to the body and inverted luggage rack along the edges thereof. Leveling devices may be provided under the front and rear of the unit to provide a very stable structure.

In a preferred embodiment, the top section of the body enclosure has a trap door type opening therein to permit access to the enclosure while the tent structure is erected. Furthermore, provision may be provided within the lower half of the body of the trailer so as to properly receive items such as an ice chest whereupon the item is precluded by virtue of a boundry of sorts from moving about the enclosure during transit.

DESCRIPTION OF THE PREFERRED EMBODIMENTS

Figure 1:
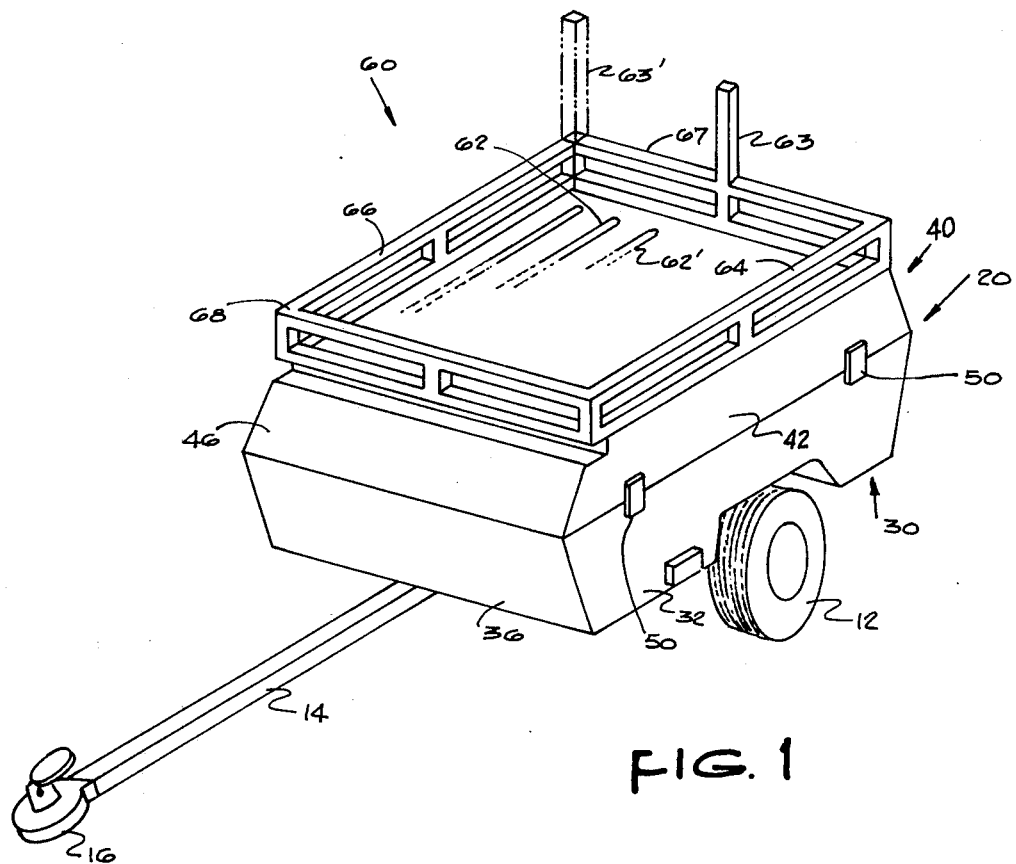
FIG. 1 is an isometric view of the trailer-camper combination of the present invention.
Figure 2:
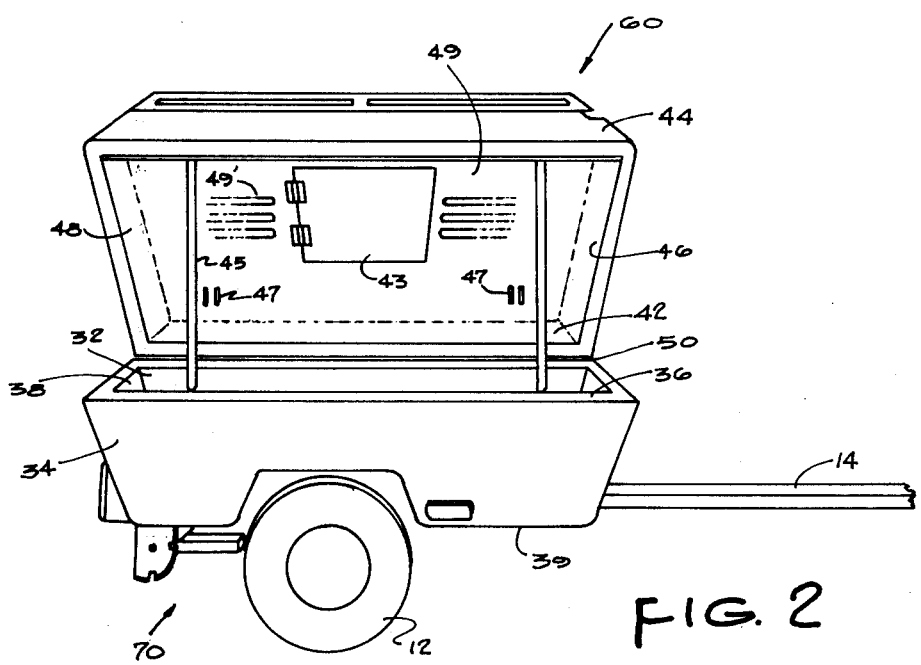
FIG. 2 is a side view of the trailer-camper combination according to the present invention showing the top of the body in an extended position.
Figure 3:
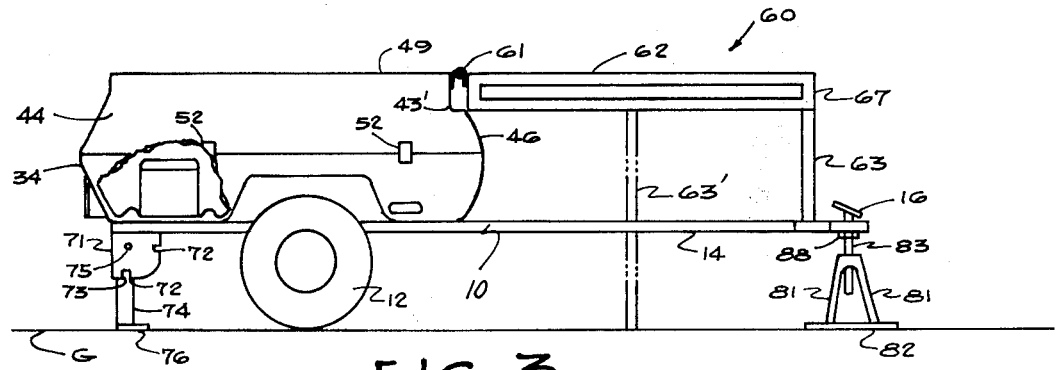
FIG. 3 is a side view of the trailer-camper unit of the present invention with the luggage rack pivoted to a forward position to provide the planar surface.

Referring to FIGS. 1–3, the present invention will now be described in detail. The trailer-camper unit according to the present invention has a chasis generally indicated as 10 with wheels 12 being secured thereto for rotatable support thereof. A tongue 14 is secured to chasis 10 and extends outwardly therefrom to a forward terminal end where a connector element 16 is provided as is conventional with trailers for securement to a motive power source such as the rear bumper of an automobile, to a motorcycle or the like. A trailer body generally indicated as 20 is secured to chasis 10 in suitable fashion. Trailer body 20 is made up of a bottom body section 30 and a top body section 40. Bottom body section 30 is made up of side walls 32 and 34, a front wall 36 and a rear wall 38. A bottom wall 39 is likewise provided. Similarly, top body section 40 is provided with side walls 42 and 44, a front wall 46, a rear wall 48 and a top 49. As shown in FIG. 2, the purpose of which will be described hereinafter, top wall 49 is provided with a trap door 43 hingedly secured therein.

Bottom body section 30 is secured to chasis 10 in any suitable manner while top body section 40 is secureable to bottom section 30 in any desirable fashion. For example, a hinge connection 50 may be provided between body sections 30 and 40 along a side wall, such as side walls 32 and 42. Additionally, latch means exemplified by 52 may be provided along any of the side, front or rear walls so as to properly secure the body sections together. With top body section 40 hingedly secured to bottom section 20, the enclosure within the body section may be accessible by raising the top section 40 and holding same in an open position with one or more supports 45 as illustrated in FIG. 2. The supports 45 may be pivotally secured to the underside of top 49 of section 40 and held thereat by clip means 47. When desired to hold the body sections apart, supports 45 may be withdrawn from clip sections 47 and propped against an appropriate receiving position of bottom section 30.

As mentioned above, the hinge connections 50 may be replaced with simple latch means 52 part or all the way around the enclosure so as to permit the top body section 40 to be completely removed from the bottom body section 30 whereby a simple trailer unit is exposed without a top for general hauling or other use. In a preferred embodiment, the hinge means are supplied along one side with latch means on at least one other side. Note further that insofar as body 20 is concerned, front walls 36 and 46 of the respective body sections are tapered rearwardly so as to improve the aerodynamic properties of the trailer unit.

Located atop body section 40 is a luggage rack generally indicated as 60. Luggage rack 60 comprises a bottom 62 having upstanding side walls 64 and 66, a rear wall 67 and a front wall 68. Luggage rack 60 as is illustrated particularly in FIG. 3 is secured to top body section 40 by a hinge 61 located at the juncture of front wall 46 and top 48. Note that a dished out portion 43' is provided between front wall 46 and top 48 to appropriately receive luggage rack 60 when same is pivoted forwardly as shown in FIG. 3 to construct an axial extension of top 49 of body 20. Note further that on rear wall 67 of luggage rack 60 a vertical column 63 is provided which engages tongue 14 adjacent a forward end thereof to provide support to luggage rack 60. Additionally, as illustrated in phantom in FIGS. 1 and 3, further vertical columns 63' may be utilized to support luggage rack 60 in its inverted condition, if needed. Further, in this regard, vertical columns 63 and 63' may be removably secureable to luggage rack 60 as with bolts or the like or as shown in FIG. 1, may be pivotally secured to rear wall 67 of luggage rack 60. Note further that in bottom 62 of luggage rack 60, ribs 62' may be provided to increase the strength characteristics of bottom 62. Likewise, as shown on the underside of top 49 of body section 40, ridges 49' likewise add to the strength characteristics of top 49. These ridges are not bothersome to one sleeping atop the surface with an air mattress covering same.

When it becomes desirable to convert the unit of the present invention to a camper, luggage rack 60 is folded forward with vertical member 63 and column 63', if utilized, acting as supports therefor. In the forward condition with the hinge recessed in segment 43' as illustrated in FIG. 3, a continuous planar surface exists that is made up of top 49 of body section 40 and bottom 62 of luggage rack 60.

To afford stability of the unit, a leveling member 70 is secured under a rear end of chassis 10. Leveler 70 has a body section 71 with holding notches 72 and 73 located therein. A leveler leg 74 is secured to leveler body 71 at pin 75 and has a foot 76 at a lower end thereof. A pin 77 is also provided to be received in slots 72 and 73 of body 71 depending upon the particular position of leveler 70. Leveler 70 further has a series of openings 74' along leg 74 which permit length adjustment of leg 74. Hence, in a traveling position leveler 70 is illustrated as shown in FIG. 2, while in a camper condition leveler 70 assumes the appearance of FIGS. 3, 4 and 5. Once leveler 70 is snug against a ground surface G, a further leveling means 80 is provided which is made up of a plurality of legs 81 forming a tripod on a base 82 and having a threaded nut (not shown) at the apex thereof. A threaded rod 83 is received through the threaded nut and is vertically adjustable therein. Rod 83 has a contact member 84 at the top thereof for engagement with the underside of connector 16 of tongue 14. Hence, with leveler 70 snug on the ground, threaded rod 83 of front leveler 80 is extended upwardly until pressure is applied to realize a tight supporting position between levelers 70 and 80 at which point the unit is stable. As mentioned above, however, additional vertical supports 63' may be provided for luggage rack 60, if desired, though under normal circumstances, they are not necessary.

Figure 4:
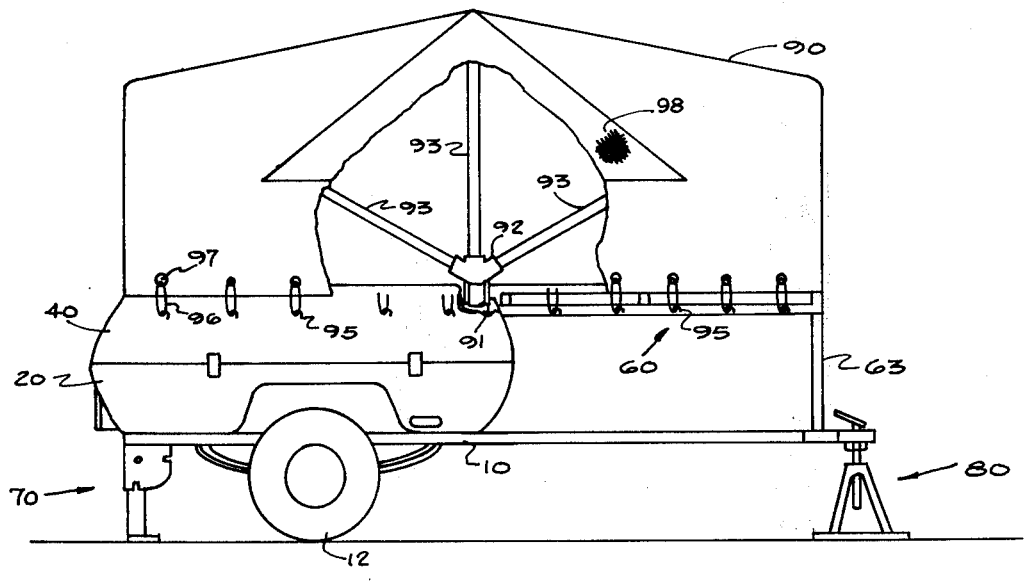
FIG. 4 is a side view of the trailer-camper unit according to the present invention showing the tent erected atop the unit.
Figure 5:
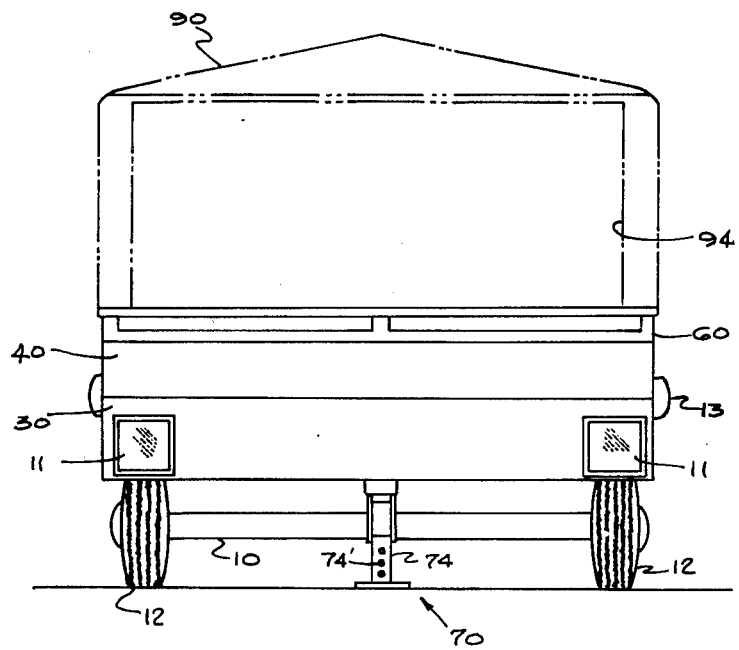
FIG. 5 is a rear view of the trailer-camper unit according to the present invention.

FIG. 4 further illustrates the unit of the present invention having a tent 90 erected atop top body section 40 and luggage rack 60. A socket 91 is provided in top body section 40 to receive a coupling element 92 for tent 90. Tent poles 93 are then received in coupling element 92 on both sides of the tent and the tent canvas is then received thereover. In normal fashion and not, per se, part of the present invention, attachment means are provided internally of the tent to be secured around tent poles 93 and appropriately attach tent canvas 90 thereto. Moreover, as illustrated in FIG. 4, hook members 95 may be provided along body section 40 and luggage rack 60 to receive tie down elements 96, normally resilient in nature, that are secured to tent 90 at grommets 97. Tie down elements 96 extend around hook members 95 and secure tent 90 around the bottom of same to the planar surface across top section 40 and luggage rack 60. Any other desirable and suitable means may also be utilized to secure tent 90 to top body section 40 and luggage rack 60. As illustrated in FIG. 5, tent 90 has a door flap 94 to provide entrance thereto. In normal fashion, door flap 94 is provided with a zipper or other means around the periphery thereof for separation from tent 90 to provide an entrance opening. Likewise, a window flap 98 is located on each side of the tent so as to provide ventilation therethrough. Note also in FIG. 5, tail lights 11 are provided so as to comply with safety standards for vehicles on public highways, along with a suitable number of reflectors 13.

Having described the present invention in detail, it is obvious that one skilled in the art will be able to make variations and modifications thereto without departing from the scope of the invention. Accordingly, the scope of the present invention should be determined only by the claims appended hereto.

What is claimed is:

1. A trailer-camper combination comprising:
   a. a wheeled frame:
   b. a tongue secured to said frame and extending forwardly therefrom;
   c. a body secured to said frame, said body having a pair of mating sections cooperating to define an enclosure therebetween, a top section of said pair of sections being securable to a bottom section of said pair of sections along at least one edge thereof;
   d. a luggage rack associated with said body, said luggage rack having a planar bottom, said luggage rack being movable forwardly and inverted to provide a planar surface extension of the top section of said enclosure, and cooperating with said top section to define a floor for a camper system; and
   e. collapsible camper cover means erectable above said floor and securable around at least a position of the periphery of said floor to provide a habitable compartment atop said floor.

2. A trailer-camper combination as defined in claim 1 wherein said frame has front and rear leveler means associated therewith to provide stability for said unit.

3. A trailer-camper combination as defined in claim 1 wherein said tongue has a connector member at a terminal portion thereof, said connector member being associable with a towing vehicle.

4. A trailer-camper unit as defined in claim 1 wherein said mating body sections are hingedly secured along a side thereof with latch means provided along another side thereof.

5. A trailer-camper combination as defined in claim 1 wherein said luggage rack is hingedly secured to said top body section adjacent a front wall thereof, said luggage rack being pivotal forwardly so as to provide said planar surface extension.

6. A trailer-camper combination as defined in claim 5 wherein said luggage rack has a vertical element extending outwardly therefrom for engagement with said tongue when said luggage rack is pivoted forwardly around its hinge connection with said top body section to thereby afford support for said luggage rack portion of said floor.

7. A trailer-camper combination as defined in claim 1 wherein said collapsible camper cover means comprise a tent, said tent including tent poles and a cover therefor, said tent poles being received in sockets therefor adjacent said top body section, whereby said tent poles extend upwardly and receive the tent cover therearound.

8. A trailer-camper combination as defined in claim 7 wherein said top body section and said luggage rack have a plurality of hooks along the edges thereof, and wherein said tent has a plurality of tie down elements secured along a lower portion thereof, said tie down elements being connectable to said hooks so as to secure a bottom portion of said tent to said floor defined by said top body section and said luggage rack.

9. A trailer-camper combination as defined in claim 1 wherein said top body section has a door in a top thereof whereby access may be provided to the enclosure defined by said body section when said tent is erected.

10. A trailer-camper combination comprising:
    a. a wheeled frame, said frame having a leveler means secured along a rear portion thereof, said leveler means being pivotal into and out of a leveling position;
    b. a tongue secured to said frame and extending outwardly therefrom, said tongue having a forward leveling means associable therewith;
    c. a body secured to said frame, said body comprising a pair of mating sections cooperating to define a body enclosure, a lower of said sections being secured to said frame and an upper of said sections being hingedly secured along a side thereof to the other of said sections, said sections having latch means located on an opposite side thereof to the hinge connection, said top body section having a ribbed surface in the top thereof;
    d. a luggage rack hingedly connected to said top body section along a front wall thereof, said luggage rack having a floor having longitudinal ribs provided therealong and having an upstanding rack secured to the floor and extending around the periphery thereof, said luggage rack further having a vertical support member secureable thereto, said luggage rack being pivotal forwardly whereby said vertical support member engages said tongue to provide support for said inverted luggage rack whereupon said top surface of said body section and the underside of said floor of said luggage rack define a planar floor surface; and
    e. collapsible cover means erectable above said floor and secureable thereto to provide a habitable compartment atop said floor.

11. A trailer-camper combination as defined in claim 10 wherein said collapsible cover means comprises a tent that is supported by a plurality of tent poles, said tent poles being associable with said top body section for support of same.

12. A trailer-camper combination comprising
    a. a wheeled frame;
    b. a tongue secured to said frame and extending forwardly therefrom;
    c. a body secured to said frame, said body having a pair of mating sections cooperating to define an enclosure therebetween, a top section of said pair of sections being securable to the other of said sections along at least one edge thereof, and having a generally planar upper surface;

d. a planar member hingedly secured to said upper body and having support means provided thereon, said member being moveable forwardly of said body, and maintained thereat by said support means engaging said tongue, whereby said planar member and said upper body section cooperate to define a planar floor for a camper system: and e. collapsible camper cover means erectable above said floor and securable around at least a portion of the periphery of said floor to provide a habitable compartment atop said floor.

13. A trailer-camper combination as defined in claim 12 wherein said support means is secured to an upper side thereof, whereby said planar member is inverted to cooperate with said upper section and define said floor.

* * * * *